United States Patent [19]

Sakuraya et al.

[11] Patent Number: 4,539,020
[45] Date of Patent: Sep. 3, 1985

[54] METHODS FOR OBTAINING HIGH-PURITY CARBON MONOXIDE

[75] Inventors: Toshikazu Sakuraya; Tetsuya Fujii, both of Chiba; Shigeo Matsui; Shigeki Hayashi, both of Shiga, all of Japan

[73] Assignees: Kawasaki Steel Corporation, Kyogo; Osaka Sanso Kogyo Ltd., Osaka, both of Japan

[21] Appl. No.: 621,789

[22] Filed: Jun. 18, 1984

[30] Foreign Application Priority Data

Jul. 10, 1983 [JP] Japan .................................. 58-188117
Oct. 6, 1983 [JP] Japan .................................. 58-187479

[51] Int. Cl.$^3$ ............................................. B01D 53/04
[52] U.S. Cl. ............................................. 55/26; 55/58; 55/62; 55/68
[58] Field of Search ................... 55/25, 26, 58, 62, 68, 55/75

[56] References Cited

U.S. PATENT DOCUMENTS

| | | | |
|---|---|---|---|
| 2,944,627 | 7/1960 | Skarstrom | 55/62 X |
| 3,176,444 | 4/1965 | Kiyonaga | 55/26 |
| 3,226,913 | 1/1966 | Avery | 55/25 |
| 3,430,418 | 3/1969 | Wagner | 55/25 |
| 3,796,022 | 3/1974 | Simonet et al. | 55/25 |
| 4,299,596 | 11/1981 | Benkmann | 55/26 |
| 4,468,238 | 8/1984 | Matsui et al. | 55/26 |
| 4,470,829 | 9/1984 | Hirai et al. | 55/68 |

Primary Examiner—Robert Spitzer
Attorney, Agent, or Firm—Browdy and Neimark

[57] ABSTRACT

A process for separating carbon monoxide from a feed gas comprising $CO_2$, CO and less adsorbable component than CO through PSA by using at least two adsorption columns in two stage adsorption operation which comprises a first adsorption stage for removing $CO_2$ from said feed gas and a second adsorption stage for separating CO from gaseous mixture withdrawn from the first adsorption stage:

(1) the first adsorption stage comprising a pressure swing adsorption repeating adsorption and desorption, and

(2) the second adsorption stage comprising:
  (i) pressurization by the first stage product gas,
  (ii) adsorption,
  (iii) depressurization,
  (iv) purge by product gas,
  (v) evacuation for recovering product gas, and
  (vi) pressurization by gas withdrawn in other column, periodically switching the flow between or among said columns so as to repeat the above steps in the columns, and a process for separating carbon monoxide from a feed gas comprising carbon monoxide and less adsorbable component than CO through pressure swing adsorption by using at least two adsorption columns containing an adsorbent exhibiting selective adsorb property to carbon monoxide which comprises:

(i) pressurization by feed gas,
  (ii) adsorption,
  (iii) depressurization,
  (iv) purge by product gas,
  (v) evacuation for recovering product gas, and
  (vi) pressurization by gas withdrawn in other column, periodically switching the flow between or among said columns so as to repeat the above steps in the columns are disclosed.

17 Claims, 5 Drawing Figures

METHODS FOR OBTAINING HIGH-PURITY CARBON MONOXIDE

BACKGROUND OF THE INVENTION

The present invention relates to a method for obtaining high-purity carbon monoxide from a feed gas, such as off-gases from converters furnace or blast furnaces, containing carbon dioxide and nitrogen in addition to carbon monoxide by a modification of the pressure swing adsorption (PSA) technique.

Off-gases from refining vessels used in iron mills containing farily large amounts of carbon monoxide. The chemical composition of off-gases from a converter and a blast furnace are listed below.

|  | CO | $CO_2$ | $N_2$ | $H_2$ |
|---|---|---|---|---|
| Off-gas from converter furnace | 60–87% | 3–20% | 3–20% | 1–10% |
| Off-gas from blast furnace | 20–30% | 20–30% | 40–60% | 1–10% |

High-purity CO recovered from these off-gases at low cost could be used as a raw material for synthesis of chemicals or as a gas to be blown into molten metal in refining vessels. Most reactions for the synthesis of chemicals require high temperatures and pressures, and therefore, the CO used should have the lowest possible content of $CO_2$ that corrodes the reactor by oxidation. In order to ensure a high reaction efficiency, $N_2$ that usually does not take part in the reaction should be removed as much as possible. While various gases are blown into a refining vessel for the purpose of increasing the efficiency of metal refining, argon that is expensive is typically used in order to avoid the increase in the concentrations of impure gases (e.g. $H_2$ and $N_2$) in the molten metal. Since off-gases are produced in large quantities from converters and blast furnaces in an iron mill, high-purity CO recovered from these gases at low cost could be used as an almost equally effective alternative to argon. In this case, the nitrogen content of the high-purity CO should be as low as possible for the purpose of preventing the increase in the $N_2$ content of molten iron. Furthermore, the $CO_2$ concentration should desirably be low in order to prevent oxidative attack of the carbon-base refractory lining of refining vessesl.

It has been proposed to recover high-purity CO from off-gases from iron mills either by deep-freezing separation or by solution absorption techniques such as the copper solution method and cosorb method. However, the deep-freezing separation technique requires low temperature and high pressure, whereas the solution absorption technique requires high temperature and pressure. Furthermore, both techniques need complicated and expensive equipment. Another disadvantage with the deep-freezing technique is that the boiling points of $N_2$ and CO are so close to each other that their complete separation is very difficult.

Therefore, the present inventors looked to adsorption techniques for recovering high-purity CO by a simpler and less expensive process. The objective of the inventors was to recover high-purity CO not only from off-gases from refining furnaces but also from off-gases from petroleum refineries and chemical synthesis plants, as well as from off-gases resulting from the partial oxidation or hydroreforming of natural gas and heavy hydrocarbon oils.

Separation of gases by pressure-swing adsorption (PSA) is known, and methods for recovery of less strongly adsorbable gases (those components which are not easily adsorbed on an adsorbent) are shown in Japanese Patent Publication Nos. 23928/63 and 15045/68. However, as far as the inventors know, nobody has succeeded in recovery of high-purity CO from off-gases containing not only nitrogen but also carbon dioxide which has a high tendency to be adsorbed together with carbon monoxide.

U.S. Ser. No. 517,272 by Matsui et al filed on July 26, 1983, now U.S. Pat. No. 4,468,238, which was assigned to the assignee of this invention, discloses removal of nitrogen from mixture comprising nitrogen and carbon monoxide or nitrogen, carbon monoxide and carbon dioxide. However, Matsui et al does not disclose separation of carbon dioxide from said mixture.

SUMMARY OF THE INVENITON

An object of this invention is to provide a process for separating CO from a mixture comprising at least CO and $CO_2$ through a PSA process.

Another object of this invention is to provide a process for separating CO from a mixture comprising at least CO in which the Matsui et al process is improved.

Still another object of this invention is to provide a process for separating CO from a mixture comprising at least CO in which the adsorption step is carried out at near atmospheric pressure thereby saving energy normally needed for pressurizing adsorption columns.

This invention relates to a process for separating carbon monoxide from a feed gas comprising $CO_2$, CO and less adsorbable component than CO, such as $N_2$, $H_2$, $CH_4$ through PSA by using at least a two adsorption columns in two stage adsorption operation, which comprises a first adsorption stage for removing $CO_2$ from said feed gas and a second adsorption stage for separating CO from gaseous mixture withdrawn from the first adsorption stage:

(1) the first adsorption stage comprising a pressure swing adsorption repeating adsorption and desorption by using at least two adsorption columns containing an adsorbent such as activated carbon, or natural or synthetic zeolite exhibiting a selective absorbtion property to carbon dioxide to remove carbon dioxide from said feed gas, and (2) the second adsorption stage comprising a process for separating carbon monoxide from the gaseous mixture, which has been withdrawn from the first adsorption stage, through PSA by using at least two adsorption columns containing an adsorbent, such as activated carbon, or natural or synthetic zeolite exhibiting a selective absorb property to carbon monoxide which comprises:

(i) a step of pressurizing an adsorption column by the gaseous mixture, which has been withdrawn from the first adsorption stage, (sometimes hereinunder be referred to as first stage product gas), in which the step (vi) was previously completed;

(ii) a step of introducing the first stage product gas into the adsorption column, in which step (i) was previously completed, so as to adsorb carbon monoxide on or in the adsorbent;

(iii) a step of connecting the adsorption column, in which step (ii) was previously completed, to the other adsorption column in which step (v) was previously completed, to reduce the pressure in the former adsorption column, and increase pressure in the latter adsorption column;

(iv) a step of purging less adsorbable component than CO, such as nitrogen, by concurrently passing product gas through the adsorption column, in which step (iii) was previously completed;

(v) a step of depressurizing the adsorption column, in which step (iv) was previously completed, to a pressure below one atmospheric pressure to recover carbon monoxide adsorbed on or in the adsorbent of the adsorption column; and (vi) a step of connecting the adsorption column, in which step (v) was previously completed, to the other adsorption column, in which step (ii) was previously completed to increase pressure in the former column;

periodically switching the flow between or among said adsorption columns so as to repeat the above steps in the adsorption columns. After step (ii) is completed and before step (iii) is started, part of the gaseous mixture remaining in the column may be removed outside all the adsorption columns. The gas withdrawn in step (iv) of the other column may be introduced into the adsorption column, in which step (vi) was previously completed.

This invention also relates to a process for separating carbon monoxide from a feed gas comprising carbon monoxide and less a adsorbable component than CO, such as $N_2$, $H_2$ or $CH_4$ through pressure swing adsorption by using at least two adsorption columns containing an adsorbent exhibiting a selective absorption property to carbon monoxide which comprises:

(i) a step of pressurizing an adsorption column by the feed gas, in which the step (vi) was previously completed;

(ii) a step of introducing the feed gas into the adsorption column, in which step (i) was previously completed, so as to adsorb carbon monoxide on or in the adsorbent;

(iii) a step of connecting the adsorption column, in which step (ii) was previously completed, to the other adsorption column in which step (v) was previously completed, to reduce the pressure in the former adsorption column, and to increase pressure in the latter adsorption column;

(iv) a step of purging less adsorbable component than CO, such as $N_2$, by passing product gas through the adsorption column, in which step (iii) was previously completed;

(v) a step of depressurizing the adsorption column, in which step (iv) was previously completed, to a pressure below one atmospheric pressure to recover carbon monoxide adsorbed on or in the adsorbent of the adsorption column;

(vi) a step of a connecting the adsorption column, in which step (v) was previously completed, to the other adsorption column in which step (ii) was previously completed to increase pressure in the former column; and (vii) a step of introducing into the adsorption column, in which step (vi) was previously completed, the gas withdrawn in step (iv) of the other column, periodically switching the flow between or among said adsorption columns so as to repeat the above steps in the adsorption columns. After step (ii) is completed and before step (iii) is started, part of the gaseous mixture remaining in the column may be removed outside all the adsorption columns.

This invention also relates to a process for separating carbon monoxide from a feed gas comprising carbon monoxide oxide and a less adsorbable component than CO, such as $N_2$ through pressure swing adsorption by using at least two adsorption columns containing an adsorbent exhibiting a selective absorption property to carbon monoxide which comprises:

(i) a step of pressurizing an adsorption column by the feed gas, in which the step (vi) was previously completed;

(ii) a step of introducing the feed gas into the adsorption column, in which step (i) was previously completed, so as to adsorb carbon monoxide on or in the adsorbent;

(iii) a step of removing part of the gas remaining the adsorption column, in which step (ii) was previously completed, outside all the adsorption columns;

(iv) a step of connecting the adsorption column, in which step (iii) was previously completed, to the other adsorption column in which step (v) was previously completed, to reduce the pressure in the former adsorption column, and to increase pressure in the latter adsorption column;

(v) a step of purging less adsorbable component than CO, such as nitrogen, by passing product gas through the adsorption column, in which step (iv) was previously completed;

(vi) a step of depressurizing the adsorption column, in which step (v) was previously completed, to a pressure below one atmospheric pressure to desorb carbon monoxide adsorbed on or in the adsorbent of the adsorption column; and (vii) a step of a connecting the adsorption column, in which step (vi) was previously completed, to the other adsorption column in which step (ii) was previously completed to increase pressure in the former column;

periodically switching the flow between or among said adsorption columns so as to repeat the above steps in the columns.

DETAILED DESCRIPTION OF THE INVENTION

The adsorbents employed in the practice of the first and second adsorption stages of this invention include natural or synthetic zeolites, molecular sieves, activated carbon and the like. Mordenite type zeolite and adsorbent obtained by grinding mordenite type zeolite, followed by sintering the reformed zeolite with a binding agent, are preferable.

In the first adsorption stage, carbon dioxide is removed from a mixture comprising CO, $CO_2$ and more poorly adsorbable component than CO, such as nitrogen through PSA.

The preferable first adsorption stage comprises in the following:

At least two adsorption columns containing an adsorbent exhibiting selective absorb property to carbon dioxide are used. The process comprises:

(i) a step of pressurizing the adsorption column, in which step (v) was previously completed, to a pressure of 0.2–3.0 kg/cm$^2$.G by introducing the first stage product gas into the column countercurrently;

(ii) a step of introducing the feed gas into the adsorption column, in which step (i) was previously completed, so as to adsorb carbon dioxide on or in the adsorbent;

(iii) a step of depressurizing the adsorption column, in which step (ii) was previously completed, to near atmospheric pressure countercurrently;

(iv) a step of evacuating the adsorption column, in which step (iii) was previously completed by means of vacuum pump, blower or ejector, and preferably the column is evaporated to 30–300 Torr; and (v) a step of purging carbon dioxide by countercurrently passing the waste gas of the second adsorption stage through the adsorption column, in which step (iv) was previously completed;

periodically switching the flow between or among said adsorption columns so as to repeat the above steps in the columns.

Steps of the second adsorption stage are explained in detail in the following:

Step (i)

In this step, the first stage product gas is introduced into an adsorption column to increase pressure in the column. Since gas to be recovered according to this invention is easily adsorbable high adsorption pressure is unnecessary. In general, an adsorption pressure of as low as 3 kg./cm$^2$.G is sufficient. The adsorption pressure of less than 1 kg/cm$^2$.G, for example 0.1 kg/cm$^2$.G can also be used. However an, adsorption pressure of more than 3 kg/cm$^2$.G may be used also if desired.

Step (ii)

Adsorption step is continued until the concentration of the easily adsorbable component, for example CO, in the gas leaving the adsorption column becomes equal to the concentration of the same component entering the adsorption column, or until just before the time when the two concentrations become equal, or until a given amount of the feed gas flows into the column after the equilibrium has been reached. It is preferable that the adsorption is continued until the concentration of the easily adsorbable component in the gas leaving the adsorption column equal to the concentration of the same component entering the adsorption column, or until just before the time when the two concentrations become equal.

Step (iii)

When step (ii) is completed, the concentration of the poorly adsorbable component is relatively high around the exit of the column.

So, part of the gaseous mixture remaining in the column may be removed outside all the adsorption columns in order to enhance purity of the product gas. It is preferable that the gaseous mixture remaining in the column may be removed to a pressure of three fourth—one fifth of the adsorption pressure. This step is optional.

Step (iv)

The adsorption column, in which step (iii) was previously completed, is connected to the other adsorption column, in which step (vi) is previously completed to withdraw the gas component from the former column and introduce it into the latter column, thereby reducing the pressure in the former adsorption column to one atmosphere or a pressure close to it. The pressure in the former adsorption column may be reduced to near pressure equalization of the two columns.

Step (v)

Product gas is passed through the adsorption column, in which step (iv) was previously completed, to purge poorly adsorbable component, such as nitrogen from between the adsorbent particles. It is preferable that the pressure in this step is lower than the adsorption pressure and is higher than one atmosphere. In general, it may be unnecessary to use a pump; and the step may be carried out by connecting the adsorption column to storage tank for product gas. Preferably the product gas is concurrently passed through the column.

Step (vi)

The adsorption column, in which step (v) was previously completed, is evacuated to a pressure below one atmosphere by means of vacuum pump, blower ejector in the like in order to recover product gas, CO. It is preferable that the column is evacuated to a pressure less than 300 Torr, more preferable to 30–100 Torr.

Step (vii)

The adsorption column, in which step (vi) was previously completed, is connected to the other adsorption column, in which step (ii) was previously completed, to pressurize the former column by introducing gas from the latter column to the former column. Preferably, introduction of the gas is concurrently carried out. This step is continued until the pressure in the latter column is reduced to one atmosphere or a pressure close to it. At the end of this step, the pressure in the former column is less than one atmosphere. The pressure in the former adsorption column may be increased to near pressure equalization of the two columns.

Step (viii)

The gas withdrawn in step (v) of the other adsorption column may be introduced into the adsorption column, in which step (vii) was previously completed. This step is optional.

According to one aspect of the present invention, adsorption is carried out at nearly atmospheric pressure. The present invention generally relates to a method of separating carbon monoxide in a feed gas containing nitrogen as well as carbon monoxide, using at least two adsorption columns packed with an adsorbent selective for carbon monoxide such as activated carbon, synthetic or natural zeolite or a mixture thereof. In one aspect of the present invention where atmospheric adsorption is performed, the method comprises the following steps:

(1) introducing a feed gas from a buffer tank into a regenerated adsorption column by a suction means such as a blower provided on the exit side of the column and/or a pumping means capable of pumping at a near atmospheric pressure such as a compressor provided on the entry side of the column;

(2) continuing the introduction of the feed gas until the pressure in the adsorption column becomes equal to the pressure in the buffer tank or atmospheric pressure, and introducing another supply of the feed gas into the column by the suction means and/or pumping means, thereby causing the easily adsorbable component to be adsorbed on the adsorbent until the concentration of the easily adsorbable component in the gas leaving the adsorption column becomes equal to the concentration of the same component entering the adsorption column, or until just before the time when the two concentrations become equal, or until a given amount of the feed gas flows into the column after the equilibrium has been reached;

(3) purging the adsorption column of the poorly adsorbable component from between the adsorbent particles by concurrently introducing a product gas after completion of the adsorption step, provided that the gas leaving the adsorption column as a result of the purging may be used to pressurize the other adsorption column;

(4) recovering the product gas by desorbing the poorly adsorbed component CO from the adsorbent by evacuating the purged adsorption column to superatmospheric pressure;

(5) optionally effecting adsorption in the other adsorption column by introducing the gas leaving the purging step; and (6) repeating the sequence of the steps (1) to (5) by periodically changing the direction of gas flow between the adsorption columns.

In step (1), the feed gas is introduced into the regenerated adsorption column by the driving force which is equal to the difference between pressure in the buffer tank and the pressure buildup created by recovering the gas discharged from the purging step.

Figure 1:
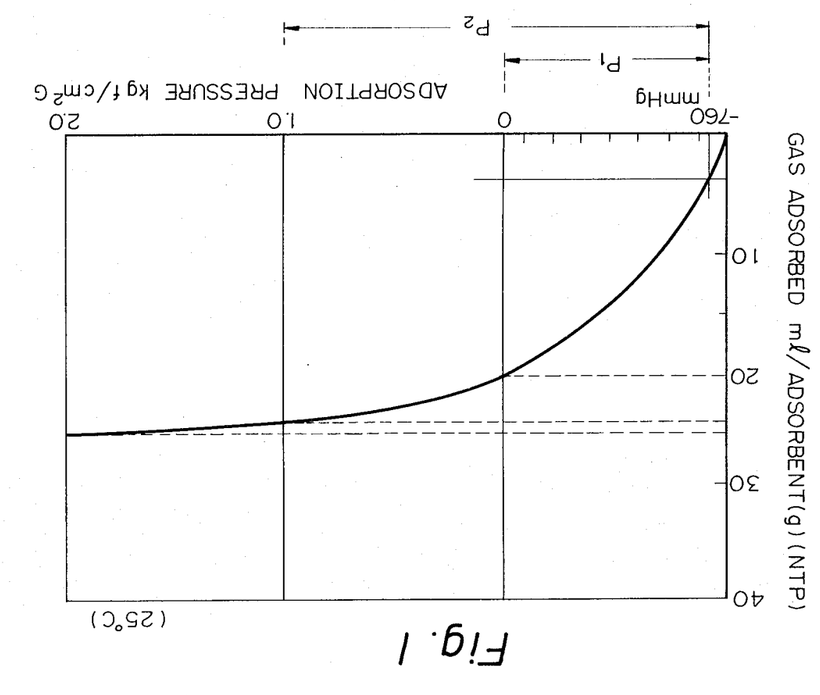
FIG. 1 is a graph showing relationship between adsorption pressure and adsorbed CO.

In step (2), the feed gas is kept introduced into the adsorption column by the suction means and/or the pumping means. In the embodiment shown, the easily adsorbed gas is desorbed under vacuum, and this results in energy saving as compared with the case where adsorption is effected at superatmospheric pressure and desorption is performed at a lower but still superatmospheric pressure. As shown in the adsorption isotherm of FIG. 1, the difference between the adsorption of CO at a near atmospheric pressure and that under vacuum is substantially the same as the difference between the adsorption at one atmosphere and that under vacuum. What counts for the purpose of the present invention is the adsorption due to the difference between the final pressure reached in gas recovery step under vacuum and the final pressure developed in the purging step which is performed at a near atmospheric pressure or a lower pressure.

Figure 2:
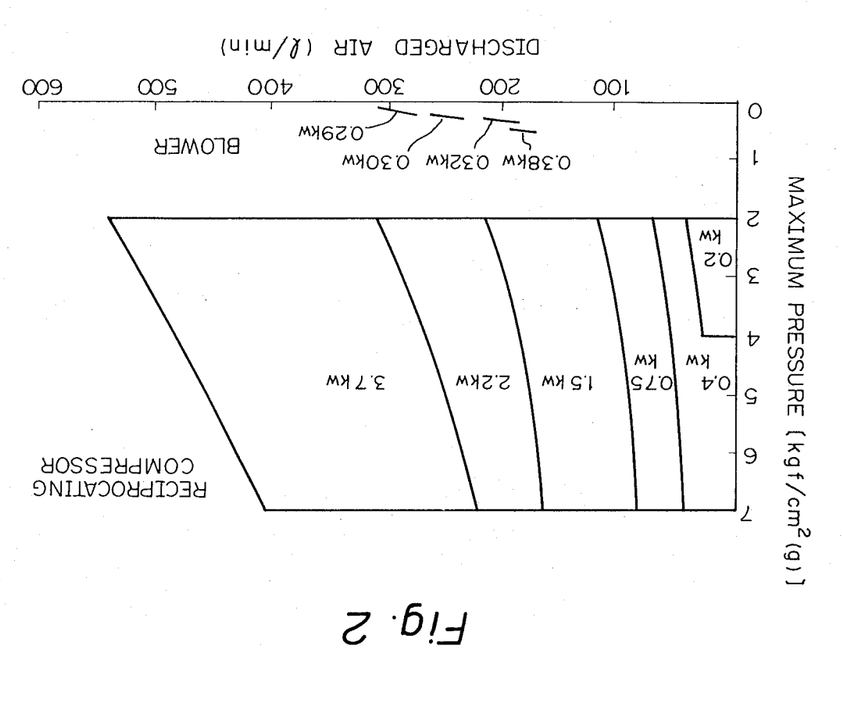
FIG. 2 is a graph showing comparison of energy in case of using reciprocating compressor with that in case of using blower.

Power requirement for pressurization by a compressor as compared with the power required for suction by a blower is shown in FIG. 2.

In step (3) that follows the adsorption step, the product gas is introduced concurrently into the adsorption column in order to displace the easily adsorbed component between adsorbent particles. Sufficient results are obtained by introducing the product gas at a pressure equal to or a little higher than the pressure used in the adsorption step; in other words, the pressure used in step (3) need not be higher than is required to substitute the strongly adsorbable gas for the feed gas or a gas more rich in the less strongly adsorbable component than said feed gas. The purity of the gas recovered is determined by the amount of the gas used or the purging period. The CO content of the gas leaving the purging step is higher than that of the feed gas because the former has a composition equal to that of the product gas except that is contains a small amount of the poorly adsorbable component that has been displaced from the space between the adsorbent particles. Therefore, the gas leaving the purging step may be directly recycled to the adsorption column that has completed the desorption step in vacuum.

In step (4), the adsorption column that has been purged is evacuated with a vacuum pump, ejector, blower or any other suitable device to a subatmospheric pressure, preferably not higher than 300 Torr, more preferably between 300 and 30 Torr. As a result, the CO is desorbed from the adsorbent and recovered as the product gas.

The present invention is explained by typical embodiment, but not limit the scope of this invention.

Figure 3:
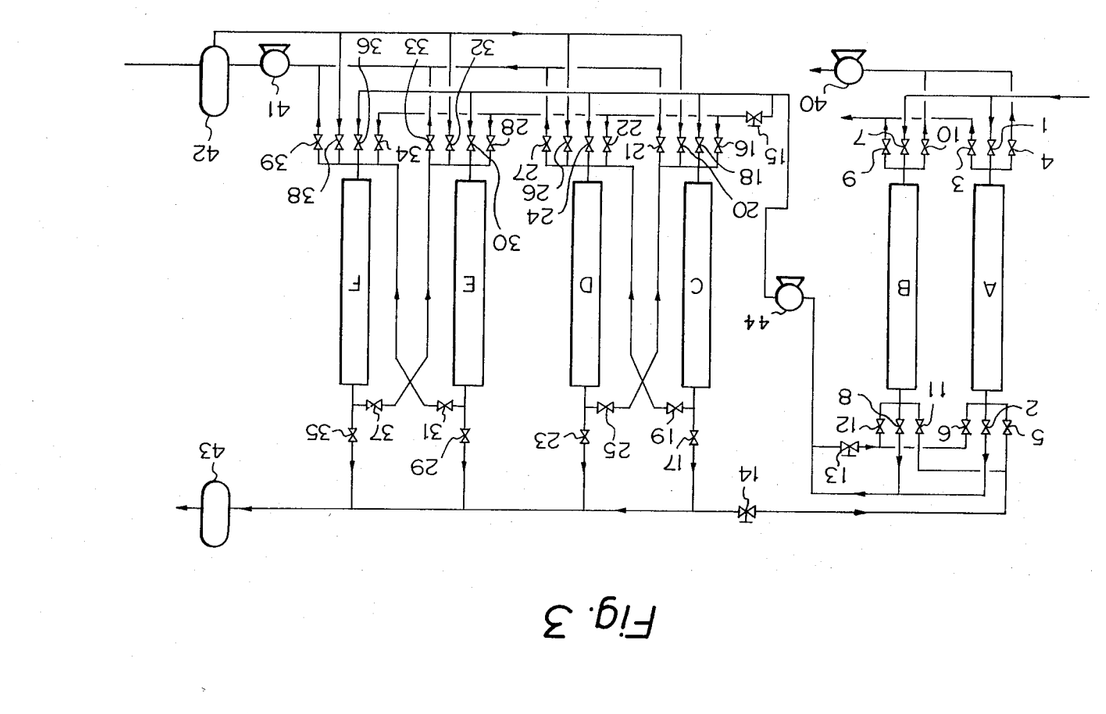
FIGS. 3–5 are flowsheets showing preferable apparatuses of this invention.

Fig. 3 is a flowsheet of the continuous adsorptive process of separating and concentrating carbon monoxide after removing carbon dioxide and nitrogen from converter off-gases. Valves are shown at 7-13 and 22-39. Adsorption columns A and B are packed with an adsorbent selective for carbon dioxide. The two columns are evacuated to 100 Torr, preferably to 60 Torr, with a vacuum pump. Then, the feed gas is introduced into column A through a valve 1, with the other valves in the system left closed.

At this time, column B is maintained in at underpressure, that is, in vacuum. After column A is pressurized, and is maintained at 0.01-3.0 kg/cm$^2$.G, preferably 0.2-1.0 kg/cm$^2$.G. Valve 2 is opened, and $CO_2$ and part of CO are adsorbed on or in the adsorbent and the remainder of the feed gas. After a definite amount of the feed gas is passed through column A for a given time, valves 1 and 2 are closed. Then, valve 3 is open, and pressure of column A is decreased to near one atmospheric pressure. Valve 3 is closed and valve 4 is open, so column A is evacuated by vacuum pump 40, blower or ejector to, preferably 100 Torr and more preferably, 30 Torr in order to desorb carbon dioxide. Valve 5 is open (at this time, amount of gas for purge is adjusted by hand valve 14), whereby $CO_2$ remaining on or in the adsorbent is purged by passing through the waste gas of the second adsorption stage. Then the pressure of column A is 270 Torr. Then valves 4 and 5 are closed, and valve 6 is open, so column A is pressurized by introducing the product gas thereto. The flow between or among said columns is switched. The first stage product gas is transported to the second stage through a pump 44.

In the second adsorption stage, CO is separated from the first stage product gas. Adsorption columns C, D, E and F contain an adsorbent exhibiting selective adsorbing property to carbon monoxide.

Adsorption columns C, D, E and F are evacuated to 100 Torr, preferably 30 Torr by means of vacuum pump 41. Valve 16 is open. The first stage product gas is introduced into adsorption column C. The rate of increase in pressure of column C is adjusted by valve 15. In the adsorption step, valves 17 and 18 are open and at the same time, is closed. Introduction of the first stage product gas is continued. Carbon monoxide is adsorbed on or in the adsorbent and more poorly adsorbable component, for example nitrogen is passed through column C. Some of the component passing through column C is used as a gas for purge in the first adsorption stage. The remainder of the component can be used as fuel, because it contains considerable amount of CO. The remainder of the component is stored in tank 43.

Adsorption step is continued by passing definite amount of the first stage product gas through column C for a given time. Valves 17 and 18 are closed and valve 19 is open. Pressure of column C is reduced to one atmospheric pressure and the gas withdrawn from column C is introduced into column D. Then valve 20 is open and part of the second stage product gas is introduced from product 42 for purging the gas remaining in the portion between the absorbent particles. The gas withdrawn in the purging step is utilized for pressurizing the other column.

Then valves 19 and 20 are closed and valve 21 is open. So, column is evacuated by vacuum pump to desorb carbon monoxide from the adsorbent. The pressure of column C is reduced to less than 300 Torr, preferably 300−30 Torr. The flow between or among said columns is switched so as to repeat the above steps in the columns. Tank for waste gas is shown at 43.

Carbon monoxide can be separated from a mixture comprising CO, $CO_2$ and more poorly adsorbable component, $N_2$ by combining the first adsorption stage and the second adsorption stage. Particularly, the waste gas of the second adsorption stage can be used as a gas for purge of the first adsorption stage. The product gas, CO separated according to the present invention contains $CO_2$ of less than 0.5% and $N_2$ of less than 1%.

Figure 4:
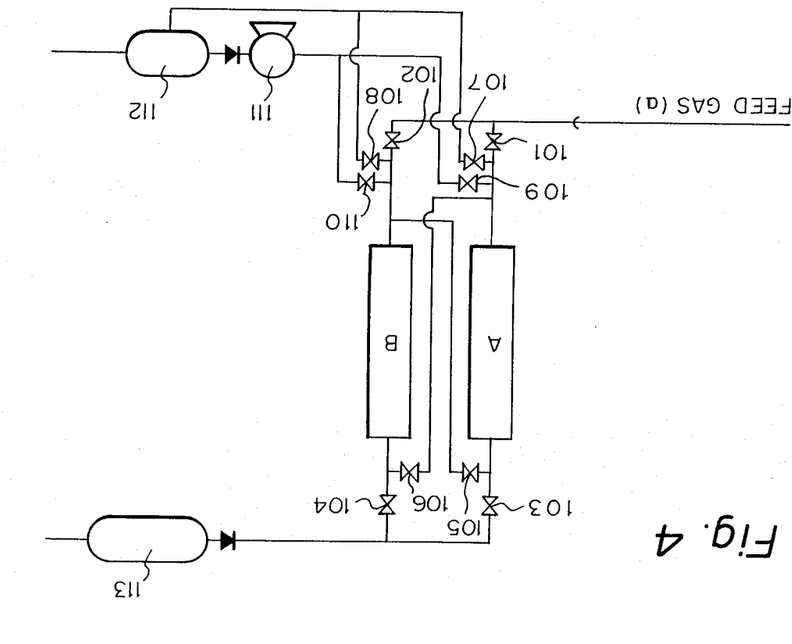
Figure 5:
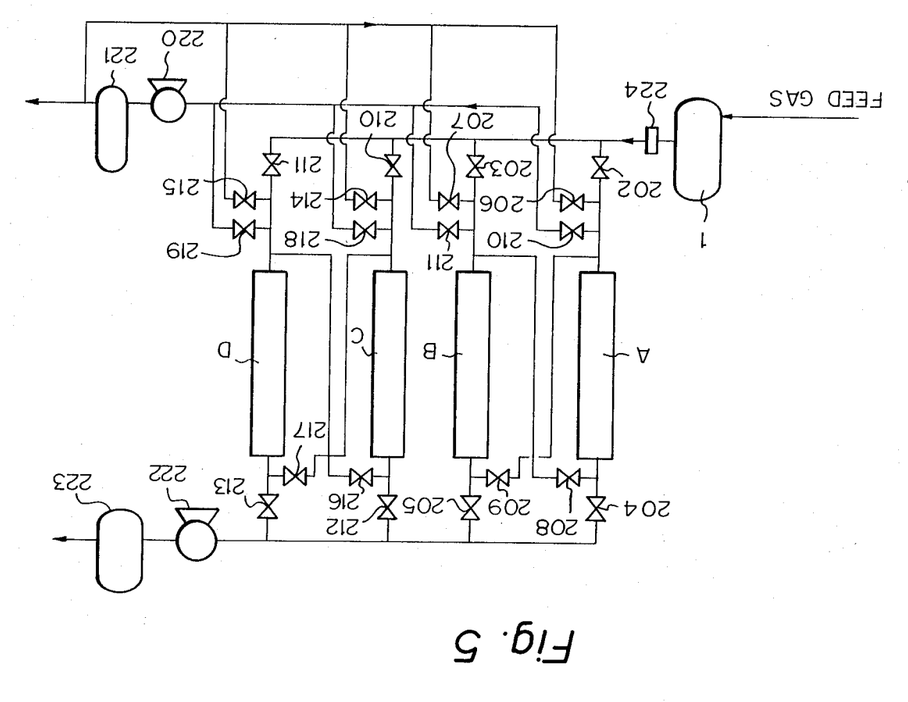

The embodiments shown in FIGS. 4 and 5 relate to separation of CO from the first stage product gas and another feed gas comprising carbon monoxide and more poorly adsorbable component, such as nitrogen. The embodiment shown in FIG. 4 is explained in the following.

Adsorption columns A and B contain absorbent exhibiting selective adsorbing property to carbon monoxide. Columns A and B are evaporated to 30 Torr, preferably 60 Torr by means of vacuum pump 111. Valve 101 is open and valves 102–110 are closed. Column A is pressurized by introducing feed gas thereinto. Column B is still maintained at a pressure close to vacuum. Valve 103 is open. Introduction of feed gas into column A is continued at a pressure of 0.1–3.0 kg/cm$^2$.G, preferably 0.2–1.0 kg/cm$^2$.G. Then valve 101 is closed. Valve 103 is open and part of the gas remaining in proportion around exit of column A is discharge to 0.1–0.75 kg/cm$^2$.G outside all of the columns. Then valve 103 is open and valve 105 is closed to connect column A to column B. The gas discharged from column A is introduced to column B until pressure of column is reduced to near one atmospheric pressure. The valve 105 is closed and valve 107 is open, so part of the product gas is passed through column A from tank 112 for product gas to purge poorly adsorbable component, $N_2$ remaining in column A. CO concentration of gas withdrawn in the purging step is higher than that in feed gas. So, the gas withdrawn in the purging step can be utilized for pressurizing the other column.

Then valve 107 is closed and valve 109 is open, so column A is evacuated by means of vacuum pump to recover product gas, CO from the adsorbent of column A. In general, pressure of column A is reduced to less than 300 Torr, preferably 300−30 Torr.

The flow between or among the columns is switched. Tank for waste gas is shown at 113.

FIG. 5 is a flowsheet for another embodiment of the continuous process for removing poorly adsorbable components (e.g. $N_2$ and $H_2$) from a converter off-gases and concentrating the easily adsorbable component (i.e. CO). Adsorption columns A, B, C and D are packed with an adsorbent selective for the easily adsorbable component. The four columns are evacuated to 300 Torr or less, preferably 30 Torr or less, with a vacuum pump 220.

When a feed gas supply valve 202 is opened, the feed gas is drawn into the adsorption column A to bring its pressure equal to the pressure in a feed gas buffer tank 201. In this mode, valves 203 to 219 are all closed, and adsorption columns B, C and D remain under vacuum. When the pressure in the adsorption column increases to a level equal to the pressure in the buffer tank (500–700 mm Hg), valve 204 is opened, whereupon the feed gas is caused to pass through the adsorption column A by being drawn with a blower 222 on the exit side of the column or by being pumped with a pumping means 224 on the entry side of the column. During this passage, the easily adsorbable component of the feed gas is adsorbed on the adsorbent whereas the poorly adsorbable components are drawn by the blower into a gas holder 223. When a predetermined period lapses or a predetermined amount of the gas is adsorbed, the feed valves 202 and 204 are closed, and at the same time, valves 206 and 208 are opened to purge the column A of the poorly adsorbable components between adsorbent particles by recycling the product gas from a product gas tank 221 through the valve 206 to the bottom of the adsorption column A. The purged gas is fed through valves 206 and 208 into adsorption column B that has completed evacuation for recovery of the product gas. After completion of this purging step, the valves 206 and 208 are closed and a valve 210 at the bottom of adsorption column A is opened to evacuate it to 300 Torr or less, preferably 30 Torr or less, with a vacuum pump 220 for desorbing the easily adsorbable component (CO) from the adsorbent and recovering the same as the product gas. By repeating the above procedures in successive adsorption columns A to D, the easily adsorbable component CO can be continuously separated, concentrated and purified.

This invention is further illustrated by the following examples, but not limit the scope.

EXAMPLE 1

In this example, off-gas from converter furnace having the following components was used.
CO: 83%
$CO_2$: 2.7%
$N_2$: 4.9%
$H_2$: 9.3%
$O_2$: 0.1%

PSA consisting of adsorption, depressurization, evacuation, purge, and pressurization by product, pressurization by feed gas was used in the first adsorption stage. PSA consisting of pressurization by first stage product gas, adsorption, depressurization, purge, evacuation and pressurization by gas withdrawn from the other column was used in the second adsorption stage.

In the first stage, steel columns ($12^B \times 1.7$ m) containing Zeoharb (available by Osaka Sanso Kogyo Ltd.) (50 kg $\frac{1}{8}$ inch pellet) were used. In the second stage, steel columns ($16^B \times 2.4$ m) containing activated Zeoharb (166 kg $\frac{1}{8}$ inch pellet) were used. All columns were evacuated to 100 Torr in the first stage and all columns were evacuated to 60 Torr in the second stage.

Said off-gas was fed into first stage columns at line speed of 6 cm/sec. 32.8 Cubic meter of said off-gas was used. 19.3 Cubic meter of product gas, carbon monoxide was obtained. Amount of waste gas was 13.5 cubic meter. Yield of CO was 68%.

The product gas had the following components:
CO: 98.6%
$CO_2$: 0.5%

N₂: 0.9%
H₂: 0
O₂: 0

EXAMPLE 2

The procedure of Example 1 was repeated except that the following off-gas from convert furnace was used and the following conditions were used.
Off-gas
CO: 86%
CO₂: 4%
N₂: 4%
H₂: 6%
Operation temperature: 25° C.
Adsorbent: ZE-501
Line speed of off-gas: 6.5 cm/sec.
Adsorption pressure: 1.1 kg/cm².G
Amount of off-gas fed: 42.9 m³
Amount of CO recovered: 25.7 m³
  Yield of CO was 68.6%.
  The product, CO had the following components:
CO: 98.7%
CO₂: 0.5%
N₂: 0.8%

EXAMPLE 3

In this example, only second adsorption stage was conducted. Feed gas had the following components:
CO: 85.3%
N₂: 5.7%
CO₂: 0.15%
H₂: 8.55%
  Adsorption cycle was in the following:
  1. Pressurization by feed gas-adsorption-adsorption-depressurization (gas discharged from column is not utilized in other column)-depressurization (gas discharged in column is utilized in other column)-purge-evacuation-pressurization
1. Pressurization by feed gas
2. Adsorption
3. Depressurization (gas discharged from column is not utilized in other column)
4. Depressurization (gas discharged from column is utilized in other column)
5. Purge
6. Evacuation
7. Pressurization by gas discharged by gas in 4 dipressurization
8. Pressurization by purge gas SGP columns containing activated synthetic zeolite (MS-5) (⅛ pellet) were used. All columns were evacuated to 60 Torr. Line speed of feed gas was 2 cm/sec. Amount of feed gas was 26.32 NM³ (cubic meter in normal stage). Amount of CO recovered was 11.63 NM³. Yield was 51.7%. Purity of CO was 99.9% with N₂ of 0.09%.

EXAMPLE 4

The procedure of Example 3 was repeated except that pressurization (7) by gas discharged in depressurization (4) was not used. Amount of feed gas fed was 50.5 NM³ and amount of CO recovered was 10.8 NM³. Yield was 25.09%. Purity of CO was 99.9%.

EXAMPLE 5

In this example, adsorption was effected at one atmospheric pressure. The adsorption cycle was in the following:

1. Pressurization by feed gas
2. Adsorption at one atmospheric pressure
3. Purge by product gas
4. Evacuation
5. Pressurization by purge gas in other column
  Feed gas had the following:
CO: 88%
CO₂: 0.5%
N₂: 5.5%
H₂: 5.9%
O₂: 0.1%
Adsorbent: activated zeolite (ZE-501) (156 kg 1/16 pellet)
Temperature: 25° C.
Adsorption pressure: 100 mm Aq
Adsorption speed: 3 cm/sec.
Column: steel column (I.D. 14$^B$×2.3 m)
  Amount of feed gas was 43 NM³/hour and amount of CO recovered was 19 NM³/hour. Yield was 49.45%. Power employed was 2.9 KWH. Purity of CO was 97.8%. It contained CO₂ (0.3%) and N₂ (1.9%).

EXAMPLE 6

Procedure of Example 5 was repeated except that the following feed gas was used:

| | |
|---|---|
| CO | 85.8% |
| CO₂ | 1.2% |
| N₂ | 6.4% |
| H₂ | 6.6% |
| Amount of feed gas | 34.8 NM³/hour |
| Amount of CO recovered | 12.32 NM³/hour |
| Yield | 40.6% |
| Power employed | 1.5 KWH |
| Purity of CO | 97.7% |
| Impurities: CO₂ | 0.8% |
| N₂ | 1.5% |

Time sequence of the best process of this invention is as follows:

TABLE 1

| | First stage | |
|---|---|---|
| Cycle time (second) | Column A | Column B |
| 0–15 | adsorption | depressurization |
| 15–60 | " | evacuation |
| 60–100 | " | purge by waste gas of second stage |
| 100–120 | " | pressurization by product gas |

TABLE 2

| | Second stage | |
|---|---|---|
| Cycle time (second) | Column A | Column B |
| 0–60 | evacuation | pressurization by first stage product gas (1.0 kg/cm² · G) |
| 60–120 | evacuation (80 Torr) | adsorption (1.0 kg/cm² · G) |
| 120–180 | pressurization by gas withdrawn from the other column (380 Torr) | depressurization (760 Torr) |
| 180–240 | pressurization by purge gas | purge (0 kg/cm² · G) |
| 240–300 | pressurization by first stage product gas (1.0 kg/cm² · G) | evacuation |
| 300–360 | adsorption (1.0 kg/cm² · G) | evacuation (80 Torr) |
| 360–420 | depressurization (760 Torr) | pressurization by gas withdrawn from other |

TABLE 2-continued

| Cycle time (second) | Second stage | |
|---|---|---|
| | Column A | Column B |
| 420–480 | purge (0 kg/cm² · G) | column (360 Torr) pressurization by purge gas (730 Torr) |

The following Table 3 shows the step cycle by using four adsorption columns according to this invention.

TABLE 3

| | adsorption column A | adsorption column B | adsorption column C | adsorption column D |
|---|---|---|---|---|
| 1 | evacuation | pressurization by feed gas | depressurization | pressurization by gas withdrawn from the other column |
| 2 | " | adsorption | purge by product gas | pressurization by purge gas |
| 3 | pressurization by gas withdrawn from the other column | depressurization | evacuation | pressurization by feed gas |
| 4 | pressurization by purge gas | purge by product gas | " | adsorption |
| 5 | pressurization by feed gas | evacuation | pressurization by gas withdrawn from the other column | depresurization |
| 6 | adsorption | " | pressurization by purge gas | purge by product gas |
| 7 | depressurization | pressurization by gas withdrawn from the other column | pressurization by feed gas | evacuation |
| 8 | purge by feed gas | pressurization by purge gas | adsorption | " |

EXAMPLE 7

The procedure of Example 1 was repeated under the following experimental conditions:

| Feed gas | |
|---|---|
| CO | 21% |
| CO₂ | 8% |
| CH₄ | 3% |
| H₂ | 6% |
| Temperature | 25° C. |
| Line speed of feed gas | 8.5 cm/sec. |
| Adsorption pressure | 2.0 kg/cm² · G |
| Degree of evacuation | 80 Torr (first stage) |
| | 30 Torr (second stage) |
| Amount of feed gas fed | 103 NM³ |
| Amount of CO recovered | 12.6 NM³ |
| Product Gas: CO | 99% |
| CH₄ | 0.15% |
| H₂ | 0.05% |
| CO₂ | 0.02% |
| Yield | 58% |

What is claimed is:

1. A process for separating carbon monoxide from a feed gas comprising $CO_2$, CO and a less adsorbable component than CO through PSA by using at least two adsorption columns in a two stage adsorption operation which comprises a first adsorption stage for removing $CO_2$ from said feed gas and a second adsorption stage for separating CO from gaseous mixture withdrawn from the first adsorption stage:

(1) the first adsorption stage comprising a pressure swing adsorption, repeating adsorption and desorption by using at least two first stage columns containing an adsorbent exhibiting a selective adsorption property to carbon dioxide to remove carbon dioxide from said feed gas, and (2) the second adsorption stage comprising a process for separating carbon monoxide from the gaseous mixture, which has been withdrawn for the first adsorption stage, through PSA by using at least two second stage adsorption columns containing an adsorbent exhibiting a selective adsorption property to carbon monoxide which comprises:

(i) pressurizing a second stage adsorption column by a first stage product gas which has been withdrawn from the first adsorption stage, in which the step (vi) was previously completed;

(ii) introducing the first stage product gas into the second stage adsorption column, in which step (i) was previously completed, so as to effect adsorption of carbon monoxide;

(iii) connecting the second stage adsorption column in which step (ii) was previously completed, to the other second stage absorption column in which step (v) was previously completed, to reduce the pressure in the former adsorption column, and increase pressure in the latter adsorption column;

(iv) purging a less adsorbable component than CO by passing product gas through the second stage adsorption column, in which step (iii) was previously completed;

(v) evacuating the second stage adsorption column, in which step (iv) was previously completed, to recover carbon monoxide adsorbed by the adsorbent of the adsorption column; and (vi) connecting the second stage adsorption column, in which step (v) was previously completed, to the other adsorption column, in which step (ii) was previously completed to increase pressure in the former column, periodically switching to the flow among said adsorption columns so as to repeat the above steps in the columns.

2. The process as defined in claim 1 wherein said fist adsorption stage comprises:

(i) pressuring a first stage adsorption column by said feed, (ii) introducing said feed gas into the first stage adsorption column, in which step (i) was previously completed, so as to adsorb carbon dioxide as a main component, (iii) depressurizing the first stage adsorption column, in which step (ii) was previously completed, to near one atmospheric pressure, (iv) evacuating the first stage column, in which step (iii) was previously completed, and (v) purging carbon dioxide by introducing into first stage column, in which step (iv) was previously completed, the waste gas obtained in the adsorbing step of the second stage, periodically switching the flow among said columns so as to repeat the above steps in the columns.

3. The process as defined in claim 1 wherein after step (ii) of the second stage is completed and before step (iii) of the second stage is started, the second stage further contains a step of depressurizing the second stage column, thereby discharging part of the gas remaining in the second stage column outside all the columns.

4. The process as defined in claim 3 wherein after step (vi) is completed, the second stage further contains a step of pressurizing the second stage column by gas withdrawn in the purging step of other second stage column.

5. The process as defined in claim 1 wherein after step (vi) is completed, the second stage further contains a step of pressurizing the second stage column by gas withdrawn in the purging step of other second stage column.

6. The process according to claim 1 wherein step (iii) is countercurrently carried out.

7. The process according to claim 1 wherein purge by product gas is concurrently carried out.

8. The process according to claim 1 wherein the evacuation is countercurrently carried out.

9. A process for separating carbon monoxide from a feed gas comprising carbon monoxide and less adsorbable component than CO through pressure swing adsorption by using at least two adsorption columns containing an adsorbent exhibiting a selective adsorbtion property to carbon monoxide which comprises:
   (i) pressurizing an adsorption column by the feed gas, in which the step (vi) was previously completed;
   (ii) introducing the feed gas into the adsorption column, in which step (i) was previously completed, so as to adsorb carbon monoxide,
   (iii) connecting the adsorption column, in which step (ii) was previously completed, to the other adsorption column in which step (v) was previously completed, to reduce the pressure in the former adsorption column, and to increase pressure in the latter adsorption column;
   (iv) purging less adsorbable component than CO by passing product gas through the adsorption column, in which step (iii) was previously completed;
   (v) evacuating the adsorption column, in which step (iv) was previously completed, to recover carbon monoxide adsorbed within the adsorption column;
   (vi) a connecting the adsorption column, in which step (v) was previously completed, to the other adsorption column in which step (ii) was previously completed to increase pressure in the former column, and
   (vii) introducing into the adsorption column in which step (vi) was previously completed the gas withdrawn in step (iv) of the other column, periodically switching the flow among said adsorption columns so as to repeat the above steps in the columns.

10. The process as defined in claim 9 wherein after step (ii) is completed and before step (iii) is started, the second stage further depressuring the column is carried out, thereby removing part of the gas remaining in the column outside all the columns.

11. The process according to claim 9 wherein step (iii) is countercurrently carried out.

12. The process according to claim 9 wherein purge by product gas is concurrently carried out.

13. The process according to claim 9 wherein the evacuation is countercurrently carried out.

14. A process for separating carbon monoxide from a feed gas comprising at least carbon monoxide and less adsorbable component than CO through pressure swing adsorption by using at least two adsorption columns containing an adsorbent exhibiting selective adsorb property to carbon monoxide which comprises:
   (i) pressurizing an adsorption column by the feed gas, in which the step (vi) was previously completed;
   (ii) introducing the feed gas into the adsorption column, in which step (i) was previously completed, so as to adsorb carbon monoxide;
   (iii) removing part of the gas remaining the adsorption column, in which step (ii) was previously completed, outside all the adsorption columns,
   (iv) connecting the adsorption column, in which step (iii) was previously completed, to the other adsorption column in which step (v) was previously completed, to reduce the pressure in the former adsorption column, and to increase pressure in the latter adsorption column;
   (v) purging nitrogen by passing product gas through the adsoprtion column, in which step (iv) was previously completed;
   (vi) evacuating the adsorption column, in which step (v) was previously completed, to recover carbon monoxide adsorbed in the adsorption column; and
   (vii) a connecting the adsorption column, in which step (vi) was previously completed, to the other adsorption column in which step (ii) was previously completed to increase pressure in the former column,
periodically switching the flow among said adsorption columns so as to repeat the above step in the columns.

15. The process according to claim 14 wherein step (iv) is countercurrently carried out.

16. The process according to claim 14 wherein purge by product gas is concurrently carried out.

17. The process according to claim 14 wherein the evacuation is countercurrently carried out.

* * * * *